United States Patent
Corson et al.

(10) Patent No.: US 9,491,677 B2
(45) Date of Patent: *Nov. 8, 2016

(54) METHODS AND APPARATUS FOR DOWNLINK MACRO-DIVERSITY IN CELLULAR NETWORKS

(75) Inventors: M. Scott Corson, Bridgewater, NJ (US); Samir Kapoor, Bridgewater, NJ (US); Rajiv Laroia, Bridgewater, NJ (US); Vincent D. Park, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 12/578,247

(22) Filed: Oct. 13, 2009

(65) Prior Publication Data

US 2010/0027476 A1 Feb. 4, 2010

Related U.S. Application Data

(60) Division of application No. 10/702,000, filed on Nov. 5, 2003, now Pat. No. 7,623,477, which is a continuation-in-part of application No. 10/429,627, filed on May 5, 2003.

(60) Provisional application No. 60/380,082, filed on May 6, 2002, provisional application No. 60/441,577, filed on Jan. 21, 2003.

(51) Int. Cl.
H04W 36/18 (2009.01)
H04W 40/02 (2009.01)
(Continued)

(52) U.S. Cl.
CPC .......... *H04W 36/18* (2013.01); *H04W 40/02* (2013.01); *H04W 84/12* (2013.01); *H04W 24/00* (2013.01)

(58) Field of Classification Search
None
See application file for complete search history.

(56) References Cited

U.S. PATENT DOCUMENTS

| 5,103,459 A | 4/1992 | Gilhousen et al. |
| 5,507,035 A | 4/1996 | Bantz et al. |

(Continued)

FOREIGN PATENT DOCUMENTS

| CN | 1369187 | 9/2002 |
| EP | 0622911 | 11/1994 |

(Continued)

OTHER PUBLICATIONS

IEEE 802.11a "Part 11: Wireless LAN Medium Access Control (MAC) and Physical Layer (PHY) specifications High-speed Physical Layer in the 5 GHZ Band," 1999.

(Continued)

*Primary Examiner* — Jae Y Lee
*Assistant Examiner* — Tito Pham
(74) *Attorney, Agent, or Firm* — Paul Kuo

(57) ABSTRACT

The invention described herein enables a form of downlink macro-diversity in packet-switched cellular networks. It allows packets to be selectively delivered from a network/internetwork to an end node, e.g., a wireless communication device or terminal, over a set of available link-layer connections to/from the end node, through one or more access nodes, e.g., base stations. Downlink macro-diversity is particularly important when the link-layer connections between the end node and the corresponding access node, e.g., the access links, are subject to independent or partially correlated time variations in signal strength and interference. In accordance with the invention, the end node dynamically selects the downlink to be used out of a set of available access links on a per packet basis subject to prevailing channel conditions, availability of air-link resources and other constraints. The invention improves the robustness and efficiency of communication, overall utilization of air-link resources, and quality of service experienced by the end node.

19 Claims, 9 Drawing Sheets

(51) Int. Cl.
*H04W 84/12* (2009.01)
*H04W 24/00* (2009.01)

(56) References Cited

U.S. PATENT DOCUMENTS

| | | | |
|---|---|---|---|
| 5,901,362 A | 5/1999 | Cheung et al. | |
| 5,978,365 A | 11/1999 | Yi | |
| 6,005,855 A | 12/1999 | Zehavi et al. | |
| 6,112,088 A | 8/2000 | Haartsen | |
| 6,160,999 A | 12/2000 | Chheda et al. | |
| 6,212,633 B1 | 4/2001 | Levy et al. | |
| 6,216,004 B1 | 4/2001 | Tiedemann, Jr. et al. | |
| 6,359,865 B1 | 3/2002 | Toskala et al. | |
| 6,381,458 B1 | 4/2002 | Frodigh et al. | |
| 6,477,670 B1 | 11/2002 | Ahmadvand | |
| 6,487,393 B1 | 11/2002 | Davenport et al. | |
| 6,487,406 B1 | 11/2002 | Chang et al. | |
| 6,542,490 B1 | 4/2003 | Ahmadvand et al. | |
| 6,611,231 B2 | 8/2003 | Crilly, Jr. et al. | |
| 6,636,498 B1 | 10/2003 | Leung | |
| 6,639,898 B1 | 10/2003 | Dutta et al. | |
| 6,891,832 B1 | 5/2005 | Chien et al. | |
| 6,940,869 B1 | 9/2005 | Wang et al. | |
| 6,999,434 B1 * | 2/2006 | Agrawal | H04W 36/18 370/331 |
| 7,027,443 B2 | 4/2006 | Nichols et al. | |
| 7,042,858 B1 * | 5/2006 | Ma et al. | 370/331 |
| RE39,381 E | 11/2006 | Hakkinen et al. | |
| 7,574,351 B2 * | 8/2009 | Anandakumar et al. | 704/201 |
| 7,623,477 B2 | 11/2009 | Corson et al. | |
| 2002/0068588 A1 * | 6/2002 | Yoshida et al. | 455/461 |
| 2002/0075873 A1 | 6/2002 | Lindhorst-Ko et al. | |
| 2002/0086692 A1 | 7/2002 | Chheda et al. | |
| 2002/0087716 A1 | 7/2002 | Mustafa | |
| 2002/0181437 A1 * | 12/2002 | Ohkubo et al. | 370/349 |
| 2003/0039250 A1 | 2/2003 | Nichols et al. | |
| 2003/0043773 A1 | 3/2003 | Chang | |
| 2004/0008630 A1 | 1/2004 | Corson et al. | |
| 2004/0047348 A1 | 3/2004 | O'neill | |
| 2005/0068933 A1 | 3/2005 | Kokkonen et al. | |
| 2006/0182063 A1 | 8/2006 | Ma et al. | |
| 2011/0228690 A1 | 9/2011 | Corson et al. | |

FOREIGN PATENT DOCUMENTS

| | | |
|---|---|---|
| EP | 1021874 | 7/2000 |
| EP | 1067815 A1 | 1/2001 |
| EP | 1502122 | 2/2005 |
| RU | 2099871 C1 | 12/1997 |
| RU | 2121762 C1 | 11/1998 |
| RU | 2008111828 A | 10/2009 |
| WO | WO9604734 A1 | 2/1996 |
| WO | WO9913652 | 3/1999 |
| WO | WO9967972 | 12/1999 |
| WO | WO0130039 A1 | 4/2001 |
| WO | 2004068739 A1 | 8/2004 |

OTHER PUBLICATIONS

IEEE 802.11b: "Part 11: Wireless LAN Medium Access Control (MAC) and Physical Layer (PHY) Specifications: Higher-Speed Physical Layer Extension in the 2.4 GHz Band," 1999.

International Search Report—PCT/US2003/035256, International Search Authority—European Patent Office—May 12, 2004.

PCT International Search Report, for International Application No. PCT/US03/013996,May 5, 2003.

Supplementary European Search Report—EP03750062, Search Authority—Munich Patent Office, Jun. 10, 2010.

Supplementary European Search Report—EP03779471, Search Authority—Hauge Patent Office, Oct. 20, 2010.

European Search Report—EP13000715—Search Authority—Hague—Apr. 12, 2013.

* cited by examiner

METHODS AND APPARATUS FOR DOWNLINK MACRO-DIVERSITY IN CELLULAR NETWORKS

CROSS REFERENCE TO RELATED APPLICATION

This application is a divisional of U.S. application Ser. No. 10/702,000 filed Nov. 5, 2003 which application is a continuation-in-part of pending U.S. patent application Ser. No. 10/429,627 filed May 5, 2003 which claims the benefit of U.S. Provisional Application No. 60/380,082, filed May 6, 2002 entitled: "METHODS AND APPARATUS FOR UPLINK MACRO-DIVERSITY IN PACKET-SWITCHED CELLULAR NETWORKS THROUGH INTELLIGENT, MULTILINK-INTERFACE PACKET FORWARDING, and U.S. Provisional Patent Application No. 60/441,577, filed Jan. 21, 2003 entitled: "METHODS AND APPARATUS FOR DOWNLINK MACRO-DIVERSITY IN PACKET-SWITCHED CELLULAR NETWORKS", each of which is hereby expressly incorporated by reference.

FIELD OF THE INVENTION

This invention relates to communication systems and, more particularly, to methods and apparatus for downlink macro-diversity in packet-switched cellular networks.

BACKGROUND

Existing Code Division Multiple Access (CDMA)-based cellular network technologies achieve what is often referred to as downlink macro-diversity through the use of the well-known "soft handoff" mechanism. In soft handoff mechanism, multiple copies of downlink frames at the link layer or Media Access Control (MAC) sublayer are sent in parallel from a base station controller element, which is typically centrally located in the radio access network, to multiple base stations transceivers, which subsequently simultaneously transmit the downlink frame copies to the user's wireless communication device or terminal. The wireless terminal then uses techniques such as frame selection or soft combining, as well as automatic repeat request (ARQ) mechanisms in an attempt to reconstruct and correctly receive the frames sent from the base station controller. This design has evolved primarily in support of circuit-switch applications, e.g., voice, and is not well-suited for packet-switched networking/internetworking. The concentration of information through the controlling element reduces network scalability and also increases the reliability requirements, and cost, of the controlling element. The design also imposes timing, synchronization, and communication latency requirements between the base station transceivers and/or between the base station transceivers and the controlling element.

These requirements are overly restrictive for many packet-switched network/internetwork technologies. In connectionless, packet-switched networks/internetworks such as those based on the Internet Protocol (IP), a sequence of packets (or packet flow) sent from a source node to a destination node need not follow the same path throughout the network/internetwork. It is also generally desirable to confine the dynamics of a specific air-link interface technology to the interface itself, thereby allowing network layer intelligence to be brought forward to the edge of the fixed infrastructure.

Internet Protocol Overview

IP technology is designed to enable packet-switched interconnection of a heterogeneous set of computer communication networks. A potentially diverse set of network and link layer technologies are interconnected through gateways (or routers) that provide a packet forwarding service. Information is transferred from sources to destinations as blocks of data called datagrams, where sources and destinations (or hosts) are identified by fixed length addresses. Routing in IP internetworks is connectionless in nature, in that datagrams are forwarded between routers on a hop-by-hop basis using the destination address in the datagram. Each router makes an independent next-hop forwarding decision using its own internal forwarding table. IP also provides for fragmentation and reassembly of long datagrams, if necessary, for transmission through "small packet" networks. In some IP internetworks there is relatively little distinction between hosts and routers. Herein, when no distinction is required the term "node" will be used. One distinction that generally holds true is that while any IP node may send and receive datagrams, only routers forward datagrams.

IP Internetworking Over Wireless Communication and Networking Technologies

Connectivity between nodes in an IP internetwork can be provided by both wired and wireless communications and network technologies. Wireless communication and network technology can be used to provide connectivity either directly between IP nodes that have wireless communication device interfaces or through non-IP wireless link-layer devices, such as a wireless access point serving as a bridge between a wireless LAN and a hardwired LAN. In any case, channel conditions, spatial relationships, and other factors have a significant impact on physical and link layer connectivity, which makes these connections more dynamic and time varying than in hardwired networks.

Before packets, e.g., IP datagrams, can be transmitted between two wireless communication devices, a viable communication connection must be established. The process of establishing a wireless communication connection may progress through a series of possible stages as follows.

1. In the first stage, which may be referred to as "physical layer synchronization", devices typically detect one another based on physical layer mechanisms and synchronize with one another to allow further communication.
2. In the second stage, which may be referred to as "physical layer access exchange", the devices typically exchange a series of physical layer signals or control messages to enable access to air-link resources. After this stage, the devices can send and receive link layer control messages.
3. In the third stage, which may be referred to as "link layer exchange", the devices typically exchange a series of link layer control messages. This may include tasks such as authentication, authorization, registration and establishment of keys for enciphering and deciphering link traffic. After this stage, the devices can send and receive link layer data messages. Thus, the connection is capable of supporting the exchange of network and higher layer control and data packets (e.g., IP datagrams).
4. In the fourth stage, which may be referred to as "network layer exchange", the devices typically exchange network and higher layer control messages. This may include tasks such as address resolution, network layer admission control, internetwork routing, and negotiating quality of service. Depending on the specifics of the network/internetwork scenario, various control traffic exchanges in this fourth stage may be required before exchange of general IP data traffic is supported (particularly data traffic that must traverse more than one network hop).

Note that some of the message exchanges may directly or indirectly involve entities such as Authentication, Authorization and Accounting (AAA) servers other than the wireless communication devices and the entities that encompass them (particularly in the third and fourth stages above).

In some instances a communication connection may be more specifically described as either a physical-layer connection or a link-layer connection. While the specific attributes and differences may vary depending on the particular communication technology and/or protocols, the former loosely corresponds with the end of the second stage and the later with the end of the third stage. Since a link-layer connection is typically associated with link-layer functions such as message framing and ARQ, which need not be closely coupled to a particular physical layer connection, it is possible that in some communication systems a link-layer connection may include, or operate over, multiple physical layer connections. When higher layer packets are transmitted over a physical-layer or link-layer connection, they are typically partitioned into one or more frames, where each frame may include some additional header information. Depending on the underlying technology and/or protocols, frames may be either fixed or variable in length.

SUMMARY OF THE INVENTION

The invention described herein enables a form of downlink macro-diversity in packet-switched cellular networks. It allows portions of packets, e.g., entire packets or frames which include less then an entire packet, to be selectively delivered from a network/internetwork to an end node over a set of available connections, e.g., link layer and/or physical connections, to/from the end node, through one or more access nodes. An end nodes may be, e.g., a wireless communication devices and/or terminals. Access nodes may be, e.g., base stations. This approach is consistent with a connectionless networking paradigm.

In some implementations, the new approach to downlink macro-diversity is achieved in part through the introduction of innovative selective packet replication and forwarding agents that are strategically located, or placed, within the network/internetwork. The reproduction and packet forwarding agents are coupled together with fast and intelligent control and signaling mechanisms supported by the end node. A cellular network architecture is particularly well suited for application of this invention, since an end node can typically communicate with other nodes, e.g., other end nodes and/or application server nodes, in the network/internetwork through any one of a set of available access links and/or access nodes.

In some embodiments, e.g., embodiments which use sectorized access nodes, an end node can maintain different connections with different sectors of an access node at the same time. Transmission of different portions of packets from the access node to the end node can occur over the connections that exist with the different sectors without the need to transmit the same portion of a packet to the end node multiple times, e.g., over different connections. A portion of a packet can be the entire portion of the packet, e.g., a full packet, or less than a full packet, e.g., in the case where multiple frames are used to communicate a single packet. In the sectorized case, switching between connections, e.g., links, used to communicate portions of packets may occur at packet boundaries or even at some point corresponding to transmission of a packet portion that is less than a full packet. In some cases, e.g., where frame switching is supported, switching between multiple connections may occur during transmission of a packet, e.g., on a frame boundary which is not a packet boundary. In many cases, however, even in such implementations, switching will occur at packet boundaries since frame boundaries often coincide to a packet boundary. Such implementations are possible where multiple frames are used to transmit a packet. In most cases, once a particular connection is selected for downlink transmissions, multiple packets will be transmitted before an alternate connection is subsequently selected for download transmissions.

Different communications protocols can be used on different connections which are maintained with an end node at the same time. For example IEEE 802.11 can be used on one communication connection while at the same time another communication connection with the end node is maintained using a different standard, e.g., an OFDM communications standard.

Downlink macro-diversity is particularly useful when the physical and/or link-layer connections between the end node and the corresponding access node, e.g., the access links, are subject to independent or partially correlated time variations in signal strength and interference. The invention achieves downlink macro-diversity by enabling the end node to dynamically select the downlink to be used out of a set of available access links on a per packet basis subject to prevailing channel conditions, availability of air-link resources and other constraints. The invention improves the robustness and efficiency of communication, overall utilization of air-link resources, and quality of service experienced by the end node.

DETAILED DESCRIPTION

Figure 1:
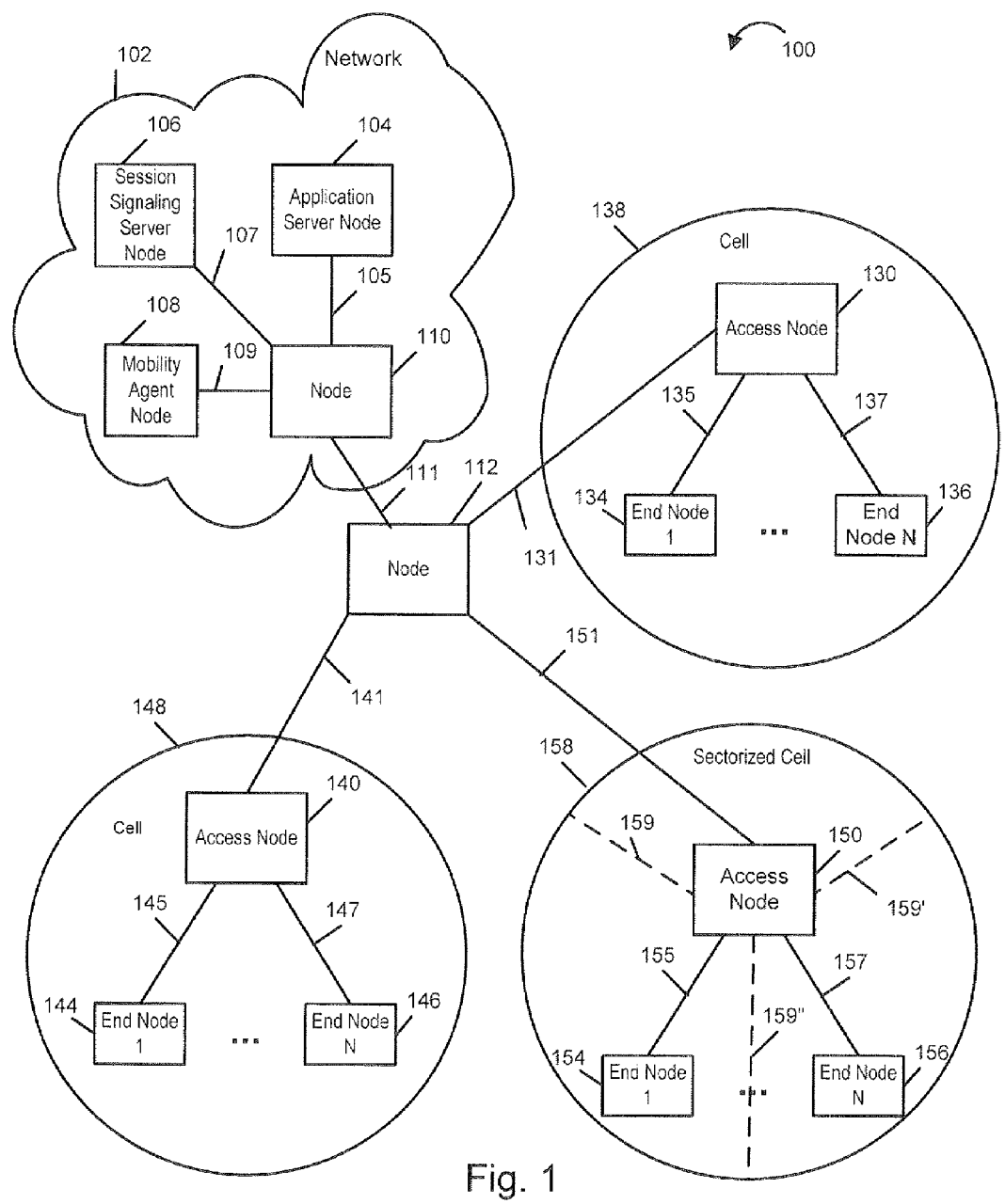
FIG. 1 illustrates a network diagram of an exemplary communications system in which the invention is applicable.

FIG. 1 illustrates an exemplary communication system 100, e.g., a cellular communication network, in which the invention is applicable. The exemplary communication system 100 comprises a plurality of nodes interconnected by communications links. Nodes in the exemplary communication system 100 may exchange information using signals, e.g., messages, based on communication protocols, e.g., IP. The communications links of the system 100 may be implemented, for example, using wires, fiber optic cables, and/or wireless communications techniques. The exemplary communication system 100 includes a plurality of end nodes 134, 136, 144, 146, 154, 156, which access the communication system via a plurality of access nodes 130, 140, 150. The end nodes 134, 136, 144, 146, 154, 156 may be, e.g., wireless communication devices or terminals, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a mobility agent node 108, e.g., Mobile IP home agent node, as may be needed to support mobility of end nodes between access nodes, a session signaling server node 106, e.g., SIP proxy server, as may be needed to support establishment and maintenance of communication sessions between end nodes, and an application server node 104, e.g., multimedia server, as may be needed to support specific application layer services.

The FIG. 1 exemplary system 100 depicts a network 102 that includes the application server node 104, the session signaling server node 106, and the mobility agent node 108, each of which is connected to an intermediate network node 110 by a corresponding network link 105, 107, 109, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., wireless access links, to provide access. A radio coverage area, e.g., communications cell, 138, 148, 158 of each access node 130, 140, 150, respectively, is illustrated as a circle surrounding the corresponding access node. The radio coverage area 158 associated with one of the access nodes 150 is depicted as being subdivided into three subsections or sectors as illustrated by the dotted lines 159, 159', 159", e.g., as may be the case with a cellular base station deployed in a three sector configuration.

The exemplary communication system 100 is subsequently used as a basis for the description of an embodiment of the invention. Alternative embodiments of the invention include various network topologies, where the number and type of network nodes, the number and type of links, and the interconnectivity between nodes may differ from that of the exemplary communication system 100 depicted in FIG. 1.

In accordance with the present invention, support for downlink macro-diversity in the exemplary system 100 is enabled by the following functional entities.

1. Selective Packet Replication Agent (SPRA): The SPRA provides support for selectively replicating a flow of packets and directing the replicated flows along separate paths, e.g., by tunneling the replicated flows to different intermediate nodes, in route to the final destination.
2. Selective Packet Forwarding Agent (SPFA): The SPFA provides support for selectively forwarding, buffering or discarding packets belonging to a particular flow.

In various embodiments of the present invention these functional entities may be located or placed at various points, or within various nodes, in the network. In some embodiments of the invention both SPRA and SPFA functional entities may be collocated, or combined, within the same network node. With respect to a packet flow, or set of packet flows, en route to a particular destination—a point, e.g., node, at which packets are replicated by a SPRA is referred to as the selective packet replication point (SPRP). Similarly, a point, e.g., node, at which packets belonging to a packet flow, or set of packet flows, are selectively forwarded, buffered, and/or discarded by a SPFA is referred to as the selective packet forwarding point (SPFP). In general, there may be multiple SPRPs and SPFPs affecting a particular packet flow, or set of packet flows, en route to a particular destination. Also, since an SPRA and SPFA may be collocated, or combined, within the same network node, it is possible for such a node to be both a SPRP and SPFP for a packet flow, or set of packet flows.

Figure 2:
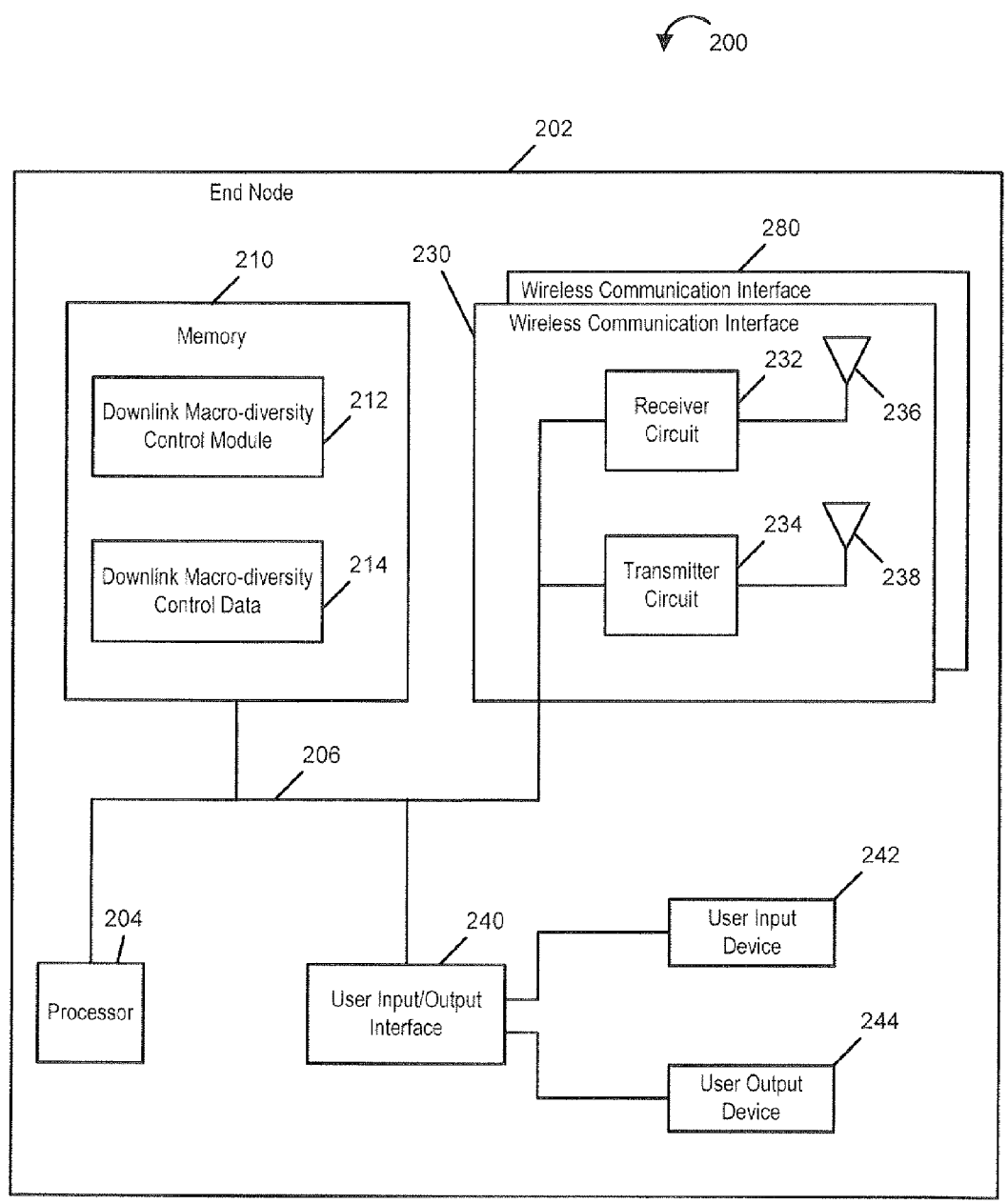
FIG. 2 illustrates an exemplary end node implemented in accordance with the present invention.

FIG. 2 provides a detailed illustration of an exemplary end node 200 implemented in accordance with the present invention. The exemplary end node 200, depicted in FIG. 2, is a detailed representation of an apparatus that may be used as any one of the end nodes 134, 136, 144, 146, 154, 156, depicted in FIG. 1. In the FIG. 2 embodiment, the end node 200 includes a processor 204, a wireless communication interface 230, another wireless communication interface 280, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interfaces 230, 280 provide a mechanism by which the internal components of the end node 200 can send and receive signals to/from external devices and network nodes, e.g., access nodes. Multiple communications interfaces 230, 280 are included in some embodiments. Each interface 230, 280 may support a different communications protocol or they may support the same communications protocol. In one embodiment the first interface supports 230 the IEEE 802.11 standard which the second interface 280 supports an OFDM communication standard which is differs from 802.11. In some embodiments each interface 230, 280 can support multiple communications connections at the same time. Each wireless communication interface 230, 280 includes, e.g., a receiver circuit 232 with a corresponding receiving antenna 236 and a transmitter circuit 234 with a corresponding transmitting antenna 238 used for coupling the end node 200 to other network nodes, e.g., via wireless communications channels. The end node 200 is capable of sending and receiving control signals and data traffic via the wireless communication interface 230 to/from multiple other nodes, e.g., access nodes, simultaneously. In some embodiments of the invention, the wireless communication interface 230 includes multiple baseband transceivers (transmitter/receiver pairs).

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish certain tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing tasks as discussed below. The modules included in memory 210 are executed on startup or as called by other modules. Modules may exchange data, information, and signals when executed. Modules may also share data and information when executed. In the FIG. 2 embodiment, the memory 210 of end node 200 of the present invention includes a downlink macro-diversity control module 212 and downlink macro-diversity control data 214.

The downlink macro-diversity control module 212 controls the operation of the end node 200 associated with replication of downlink packet flows and switching between multiple replicated downlink packet flows when the end node 200 has multiple simultaneous communication connections, e.g., access links, to one or more access nodes. Note that an end node may have simultaneous communication connections in two or more cells/sectors supported by the same access node, or different access nodes. In particular, the downlink macro-diversity control module 212 controls processing associated with monitoring the status of communication connections, assessing the relative performance or quality of available communication connections, and sending/receiving signals, e.g., messages, to coordinate the selective replication of downlink packet flows with SPRAs and/or selective forwarding of packet flows with SPFAs. Downlink macro-diversity control data 214 includes, e.g., parameters, status information, and/or other information relating to operation of downlink macro-diversity control. In particular, the downlink macro-diversity control data 214 may include configuration information (e.g., information about maximum number of simultaneous connections supported or limits on frequency of downlink switching) and operational information (e.g., information about current processing state, status of pending signal responses, etc). The downlink macro-diversity control module 212 may access and/or modify the downlink macro-diversity control data 214.

Figure 3:
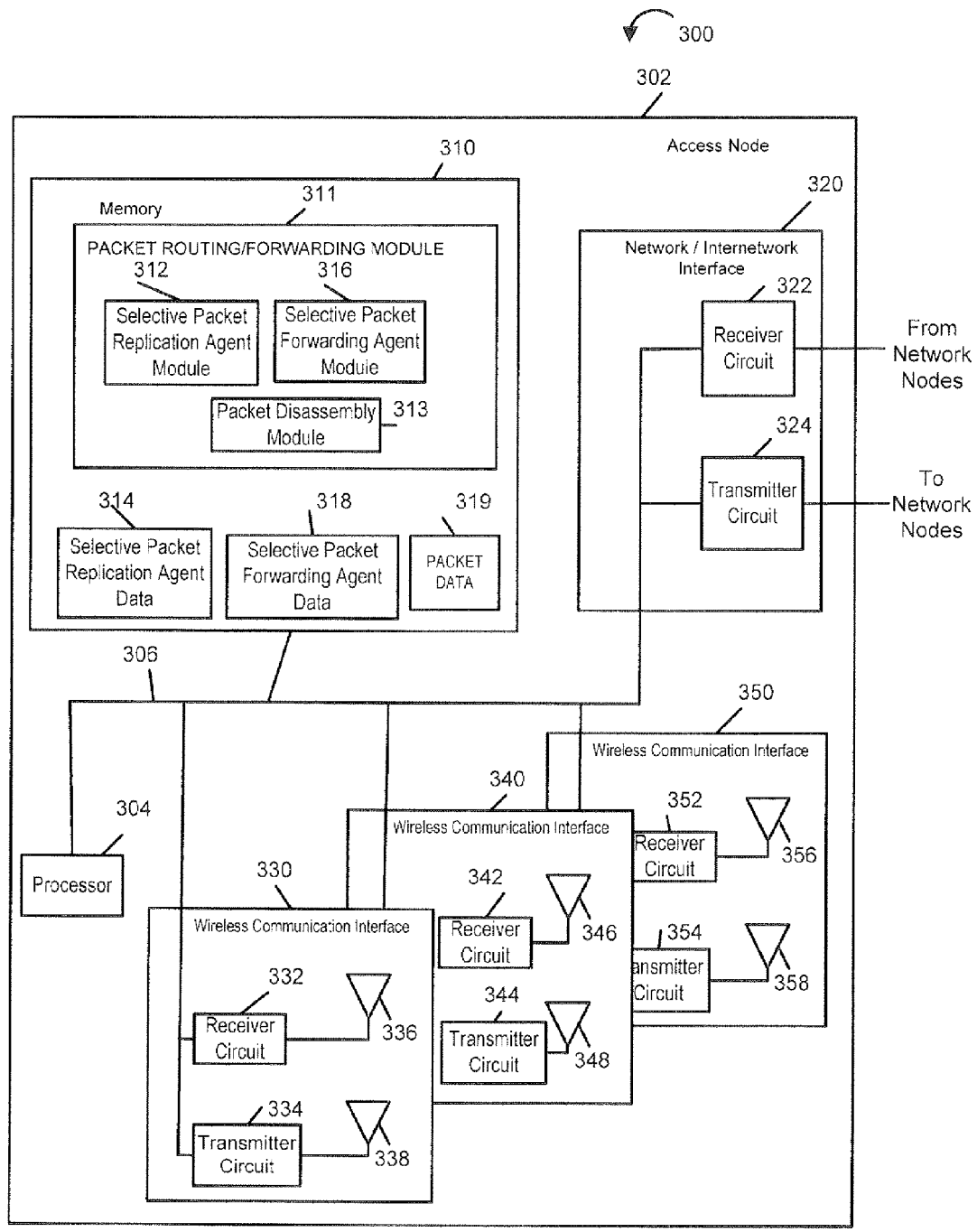
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 130, 140, 150, depicted in FIG. 1. In the FIG. 3 embodiment, the access node 300 includes a processor 304, a network/internetwork interface 320, a plurality of wireless communication interfaces 330, 340, 350 and memory 310, coupled together by a bus 306. Accordingly, via bus 306 the various components of the access node 300 can exchange information, signals and data. The components 304, 306, 310, 320, 330 of the access node 300 are located inside a housing 302. Each wireless communication interface 330, 340, 350 may correspond to a different sector of a cell. In the FIG. 3 example, three interfaces 330, 340, 350 are included providing a different interface for each of the sectors, e.g., of cell 158 shown in FIG. 1. In the case where cells are not sectorized, a single interface 330 may be used.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interfaces 330, 340, 350 also provide a mechanism by which the internal components of the access node 300 can send and receive signals to/from external devices and network nodes, e.g., end nodes. Each wireless communication interface 330, 340, 350 includes, e.g., a receiver circuit 332, 342, 352 with a corresponding receiving antenna 336, 346, 356 and a transmitter circuit 334, 344, 354 with a corresponding transmitting antenna 338, 348, 358 used for coupling the access node 300 to other network nodes, e.g., via wireless communication channels. Each wireless communication interface 330, 340, 350 can support communication connections, e.g., links, to multiple end nodes within the sector corresponding to the particular interface. In some embodiments, the interfaces 330, 340, 350 each support multiple communications protocols, e.g, 802.11 and one or more additional protocols, e.g., OFDM communications protocols. Multiple communication connections can be maintained with a single end node from a single interface 330, 340, 350 at the same time, with the interface 330, 340 or 350 using different protocols and/or communications standards with each communication connection, e.g., link. Alternatively, connections with an end node can be maintained in parallel from different interfaces using the same or different communications standards/protocols.

The processor 304 under control of various modules, e.g., routines, included in memory 310 controls operation of the access node 300 to perform various signaling and processing tasks, as discussed below. The modules included in memory 310 are executed on startup or as called by other modules. Modules may exchange data, information, and signals when executed. Modules may also share data and information when executed. In the FIG. 3 embodiment, the memory 310 of the access node 300 of the present invention includes a packet routing/forwarding module 311. The packet routing/forwarding module 311 is responsible for routing, forwarding, duplicating and/or filtering packets and/or frames which correspond to packets in accordance with the present invention. The packet rouging/forwarding module includes a selective packet replication agent SPRA module 312, a selective packet forwarding agent SPFA module 316 and a packet disassembly module 313. The memory 310 also includes data corresponding to the various modules, e.g., SPRA data 314, SPFA data 318 and packet data 319. The data may include information which controls processing by the corresponding module, e.g., network information, and/or the data corresponding to the result of processing by the corresponding module, e.g., replicated packets, packets to be forwarded, and/or frames which represent different portions of a packet to be transmitted over, e.g., a wireless link. The module 311 may route packets or portion of packets corresponding to the same data flow directed to an end node to the end node using different wireless interfaces 330, 340, 350 without the need to transmit the same packet or portion of a packet multiple times. Switching between communication connections corresponding to different sectors may occur at frame boundaries which occur within a packet or at frame boundaries which correspond to packet boundaries. Thus, different portions, e.g., frames, corresponding to the same packet may be transmitted via different sectors and the downlink from the wireless interface 330, 340 or 350 of the sector to the mobile.

The SPRA module 312 controls the operation of the access node 300 to support SPRA functionality for an end node capable of controlling downlink macro-diversity using multiple simultaneous connections, e.g., physical or link-layer connections, such as the exemplary end node 200. The SPRA module 312 controls the processing of received signals, e.g., messages, from other network nodes and/or modules, as necessary to control, e.g., start or stop, selective replication of packet flows and direct replicated packet flows via separate paths, e.g., via tunneling, in route to the final destination. The SPRA module 312 also controls the processing of received signals, e.g., messages, from other network nodes destined for associated end nodes, as necessary for classification and filtering to determine whether packet replication is required. The SPRA data 314 includes, e.g., end node identifiers, parameters, filtering information, and/or other information relating to providing SPRA functionality as described herein. The SPRA module 312 may access and/or modify the SPRA data 314.

The SPFA module 316 controls the operation of the access node 300 to support SPFA functionality for an end node capable of controlling downlink macro-diversity using multiple simultaneous connections such as the exemplary end node 200. The SPFA module 316 controls the processing of received signals, e.g., messages, from other network nodes and/or modules, as necessary to control, e.g., start or stop, selective forwarding of replicated packet flows. The SPFA module 316 also controls the processing of received signals, e.g., messages, from other network nodes destined for associated end nodes, as necessary for classification and filtering to determine whether packets should be forwarded, buffered, or discarded. The SPFA data 318 includes, e.g., end node identifiers, parameters, filtering information, and/or other information relating to providing SPFA functionality as described herein. The SPFA module 316 may access and/or modify the SPFA data 318. It can also control, in the case of a sectorized embodiment, which sector interface 330, 340, 350 will receive a portion of a packet for transmission. The portion of a packet may be an entire packet or a frame corresponding to a packet which is represented using a plurality of frames.

The access node 300 is capable of independently providing SPRA and SPFA functionality. Thus, with respect to a packet flow, or set of packet flows, traversing the access node 300 en route to a particular destination, the access node 300 may be an SPRP, an SPFP, or both an SPRP and an SPFP.

FIGS. 4, 5, 6, 7, 8 and 9 illustrate the operation of downlink macro-diversity performed in accordance the present invention in the context of the exemplary communication system 100. As compared with FIG. 1, the illustrations in FIGS. 4-8 are more logical in nature rather than physical. Accordingly, a relevant sub-set of the nodes in the exemplary communication system 100 are depicted for purposes of explaining the invention with many of the physical nodes and links having been omitted to simplify the diagram. Where signaling, or delivery of packets, is shown between two entities, it is assumed that such signals, or packets, are transported as needed via intermediate nodes and/or links physically interconnecting the two entities. The illustrations in FIGS. 4-9 include the mobility agent node 108, one or more access nodes 300, 300' implemented in accordance with the invention, and a single end node 200 implemented in accordance with the invention. The end node 200 and access nodes 300, 300' shown in FIGS. 4-9 are simplified representations of those depicted in FIGS. 2 and 3, respectively.

Figure 4:
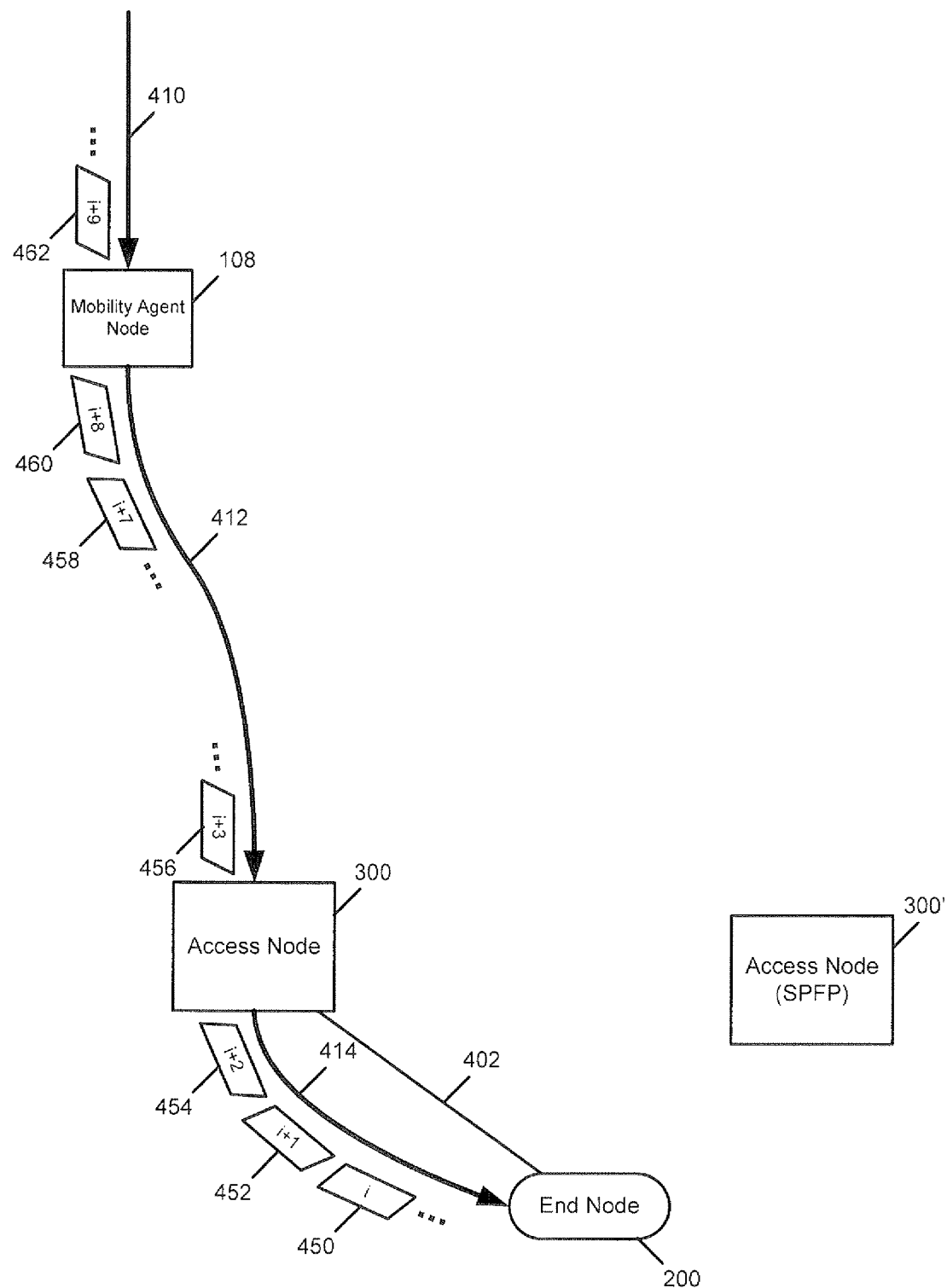
FIG. 4 illustrates a flow of packets destined for an end node that is connected to a single access node by a single communications connection.

FIG. 4 illustrates a scenario without downlink macro-diversity as a baseline for comparison. In the FIG. 4 example, the end node 200 is connected via a first access link 402 to a first access node 300. FIG. 4 also depicts a sequence of packets 450, 452, 454, 456, 458, 460, 462 with sequence numbers i to i+9, being part of a packet flow destined for the end node 200. The source of the packets 450, 452, 454, 546, 458, 460, 462 could be any other node in the exemplary communication system 100. The solid arrows 410, 412, 414 depict the path taken by the packets 450, 452, 454, 546, 458, 460, 462 as directed by routing information for the end node 200. Thus, the packets 450, 452, 454, 546, 458, 460, 462 traverse through the mobility agent node 108 and the first access node 300, from which they are delivered to the end node 200 via the first access link 402.

Figure 5:
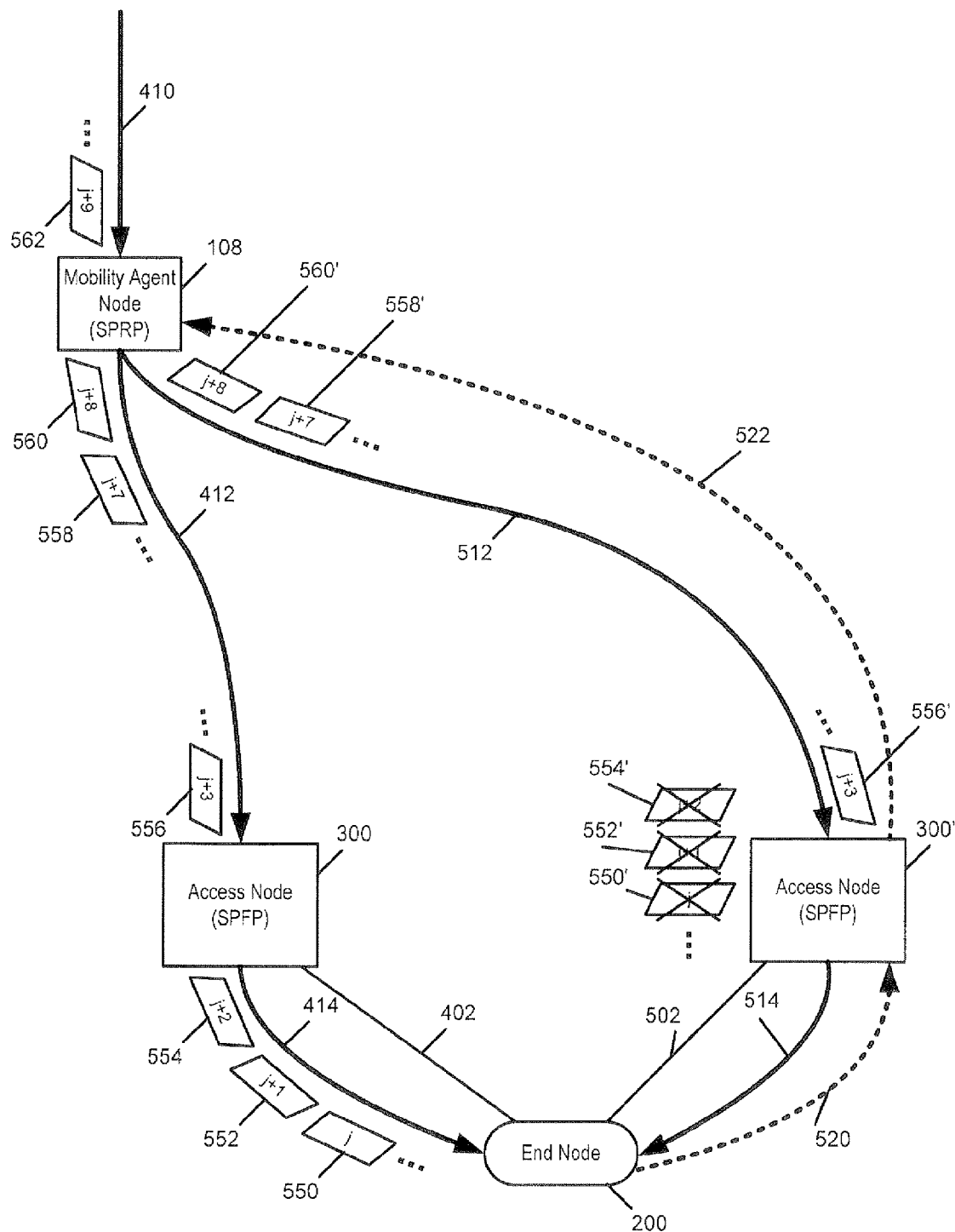
FIG. 5 illustrates signaling and operations associated with replicating a flow of packets destined for an end node that is connected to multiple access nodes, in accordance with an exemplary embodiment of the invention.
Figure 6:
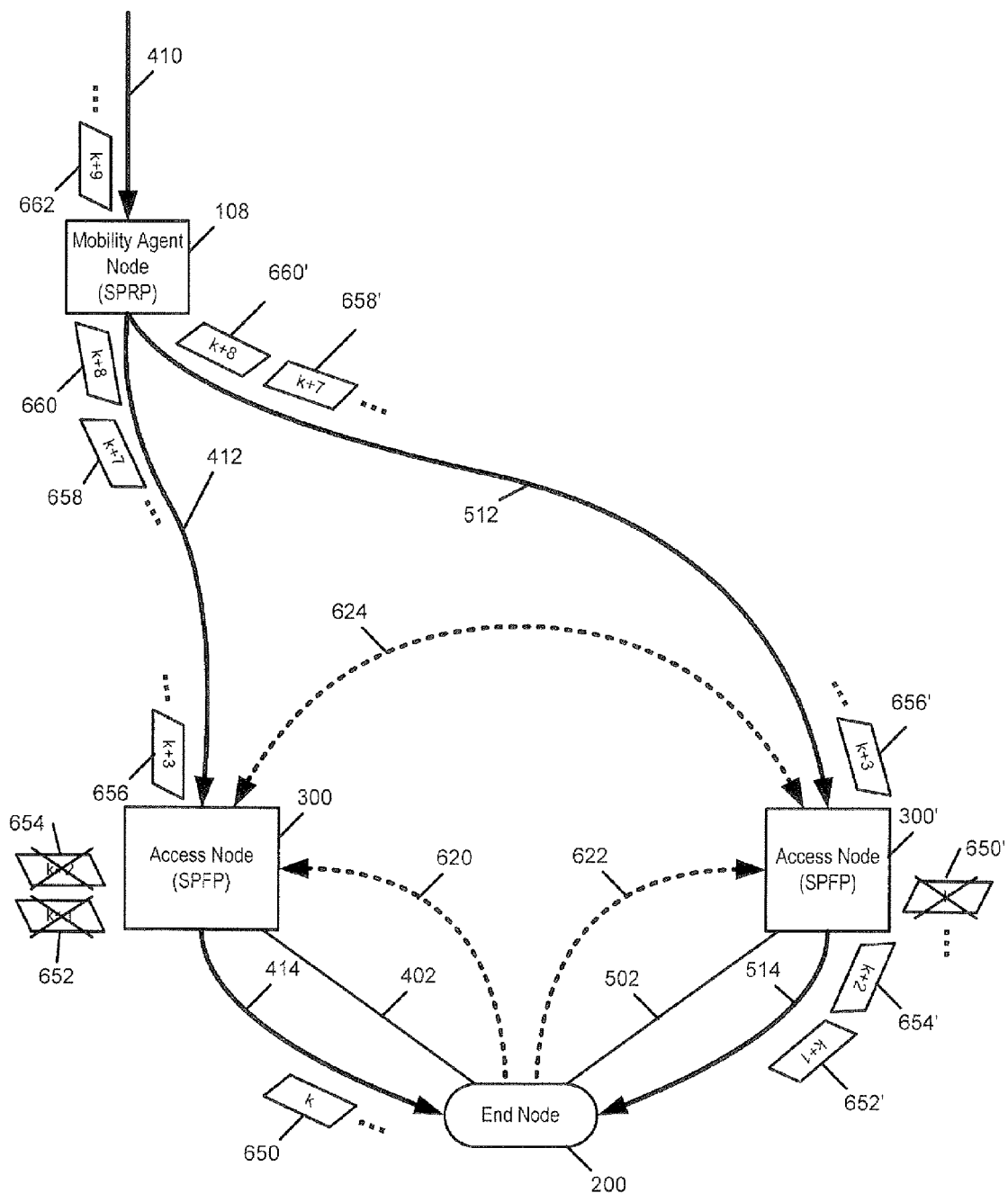
FIG. 6 illustrates signaling and operations associated with switching between replicated flows of packets destined for an end node that is connected to multiple access nodes, in accordance with an exemplary embodiment of the invention.
Figure 7:
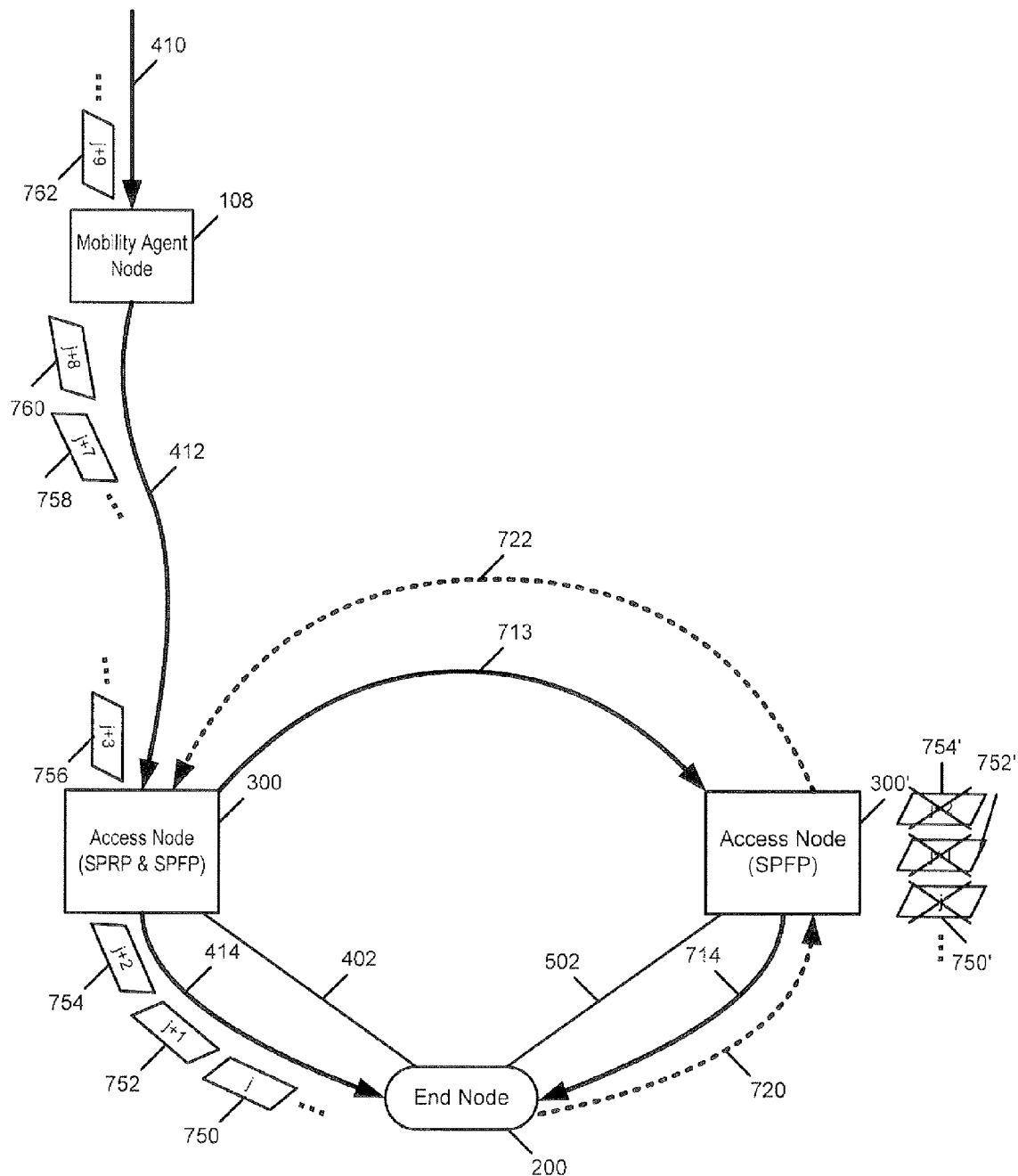
FIG. 7 illustrates signaling and operations associated with replicating a flow of packets destined for an end node that is connected to multiple access nodes, in accordance with another exemplary embodiment of the invention.
Figure 8:
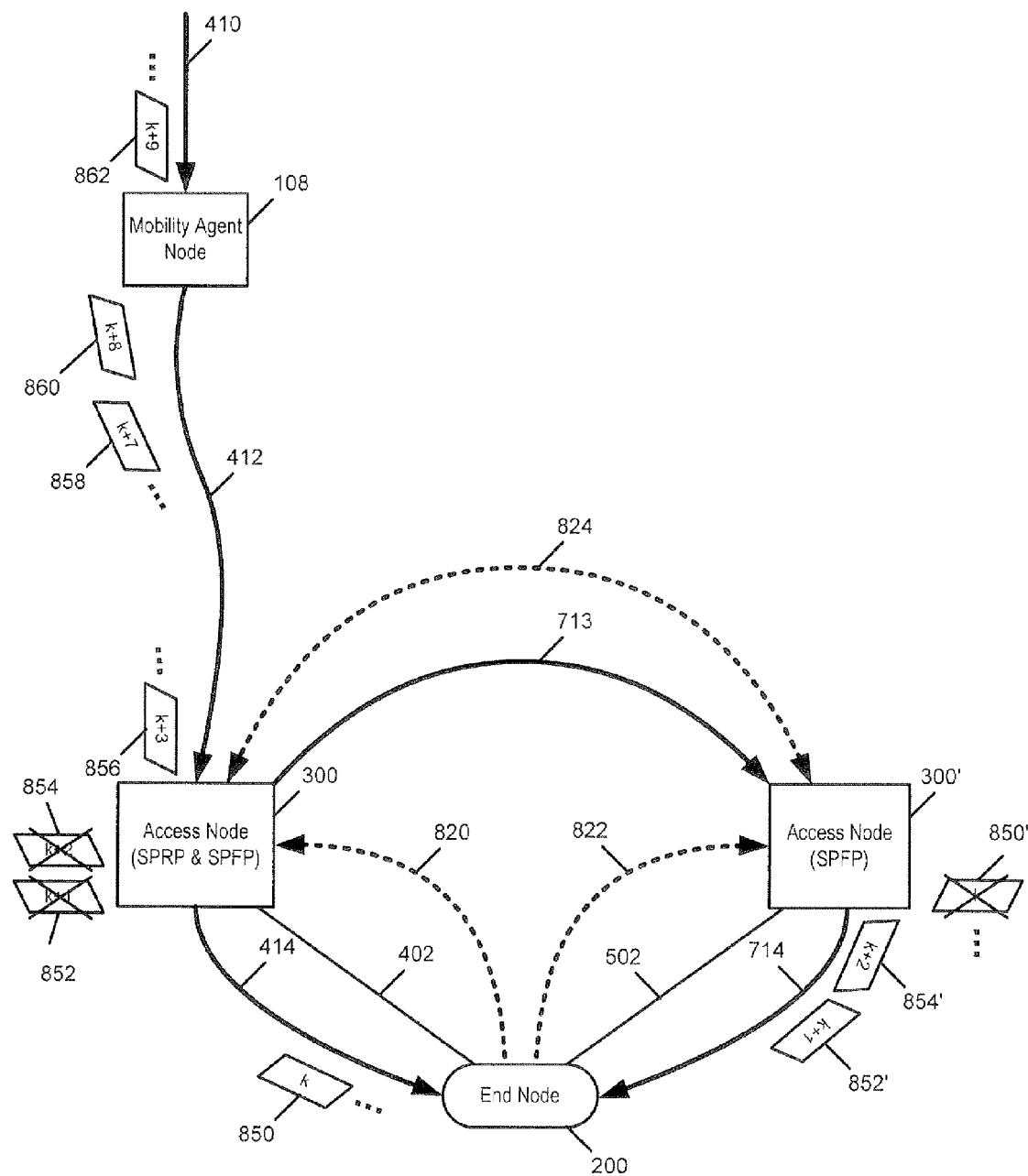
FIG. 8 illustrates signaling and operations associated with switching between replicated flows of packets destined for an end node that is connected to multiple access nodes, in accordance with the exemplary embodiment of the invention shown in FIG. 7.
Figure 9:
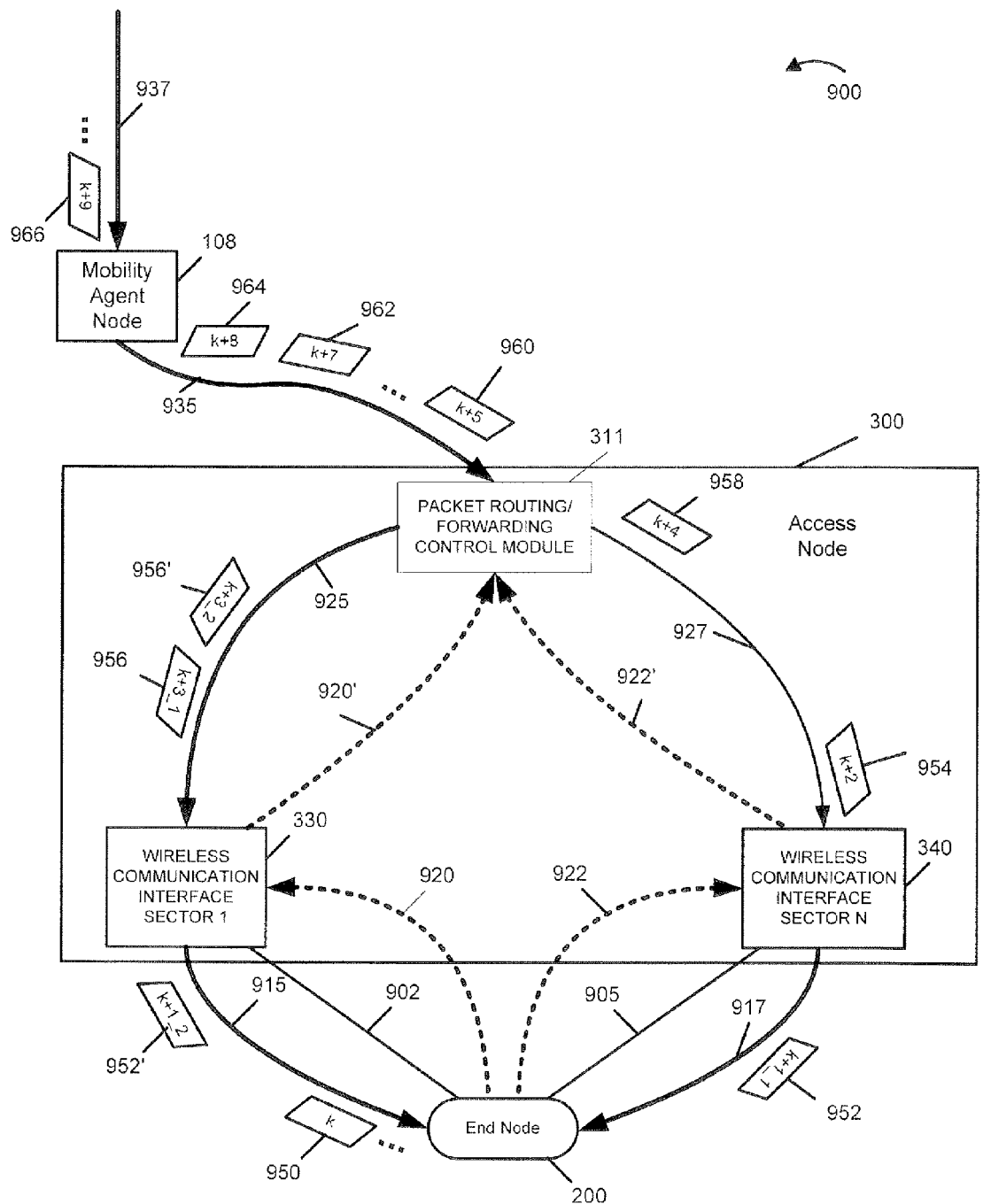
FIG. 9 illustrates an exemplary embodiment of the present invention where an end node is coupled to an access node by multiple connections over which portions of packets, e.g., frames or entire packets, can be transmitted.

FIGS. 5-9 illustrate various aspects of downlink macro-diversity. FIGS. 5 and 6 illustrate a first embodiment, FIGS. 7 and 8 illustrate a second embodiment, and FIG. 9 illustrates a third embodiment. Prior to detailing the unique aspects of the embodiments, the following describes features of the invention that are applicable to each of embodiments. In accordance with the present invention, the end node 200 periodically monitors received signals from one or more access nodes and uses this information to determine if it should establish, maintain, or tear down communication connections with a particular access node. In one embodiment, the end node 200 uses a set of configurable parameters such as, but not limited to, pilot power, pilot power averaging time duration, minimum end node transmit power required, impact on inter-cell interference, etc. as input factors for controlling connectivity. The end node 200 generally strives to maintain one or more access links, e.g., link-layer connections with one or more access nodes, as needed to provide reliable access to the network with sufficient resilience to dynamic channel conditions. Over time, as signals are received from different access nodes, the end node 200 establishes, maintains or tears down communication connections as dictated by the controlling parameters in order to maintain a suitable set of access links. The number of simultaneous communication connections is subject to the hardware and software limitations of the end node 200. In general, both the end node 200 and access nodes 300, 300' may limit the number of communication connections.

In FIGS. 5-8, the end node 200 is depicted with a plurality of communication connections, e.g., one via a first access link 402 to a first access node 300 and another via a second access link 502 to a second access node 300', while in FIG. 9 the end node 200 is depicted with a plurality of communication connections 902, 905 to a single access node 300. Note that while the examples depict a scenario with two communication connections to one or two different access nodes the invention is more widely applicable to scenarios where there are two or more communication connections with one or more access nodes.

To enable the exchange of link-layer data messages (and thus higher layer traffic), the end node 200 and access nodes 300, 300' perform the necessary operations to progress the access links 402, 502 up to and through the link layer exchange stage as previously discussed. This may be done using known techniques. The details regarding how this is accomplished are link-layer specific and will not be described herein since known methods may be used. However, in order for the end node 200 to establish multiple simultaneous link-layer connections, e.g., access links 402, 502, it may be necessary for the end node 200 to independently exchange link-layer control messages with multiple entities, e.g. access nodes 300, 300'. Furthermore, the end node 200 should be able to direct control messages to a specific entity, e.g. access node, as needed.

It is assumed that each of the access links 402, 502 is capable of supporting bi-directional exchange of link-layer data messages and higher layer traffic (such as IP datagrams), although not necessarily at every instant in time. Channel conditions, spatial relationships, and other time varying dynamic factors may impede the ability to exchange link-layer messages (and thus higher layer traffic) in one or both directions at any instant in time. Typically the physical, MAC, and link layers provide some ability to adapt to and persist through some degree of such dynamics without tearing down and re-establishing the link-layer connection. Thus, for the purpose of describing this invention, a bi-directional link-layer connection can be viewed as comprising two unidirectional link-layer connections, where the ability to send traffic in either direction may vary as a function of time. When a distinction is required or useful for explaining the invention we will refer to the connection directed from the end node to the access node as the "uplink" and the connection directed from the access node to the end node as the "downlink".

In accordance with the present invention, the end node 200 monitors the status of the available access links 402, 502 to determine the preferred link for transporting uplink and downlink traffic. Note that the preferred uplink and preferred downlink may be independently selected and thus may differ at any point in time. In a connectionless packet-switched network, the end node 200 can selectively forward uplink traffic over the set of available access links 402, 502, on a very rapid time scale to accommodate the physical and link layer dynamics. However, forwarding of downlink traffic destined for the end node 200 is typically directed based on routing information maintained by nodes in the network infrastructure, e.g., the access nodes 300, 300' and/or the mobility agent node 108. The latency of control loops and signaling associated with dynamically adapting or re-configuring the corresponding routing information for downlink traffic using traditional techniques, would typically exceed the time scale of physical and link layer dynamics. The innovations of the present invention enable selective downlink forwarding over the set of access links 402, 502 on a very rapid time scale to accommodate the physical and link layer dynamics, e.g., fast fading.

FIGS. 5 and 6 further illustrate the operation of downlink macro-diversity in accordance with a first exemplary embodiment. In this first exemplary embodiment of the present invention, the mobility agent node 108 is the SPRP and each access node 300, 300' is an SPFP. Prior to commencing use of downlink macro-diversity, it is assumed that the current state or routing information is such that packets destined for the end node 200 are directed to the first access node 300, from which they are delivered to the end node 200 via the first access link 402, e.g., along the path denoted by solid arrows 410, 412, 414. Based, in part, on analysis of received signals from the access nodes, as previously described, the end node 200 initiates the establishment of a second access link 502 via the second access node 300'.

Upon establishment of the second access link 502, the end node 200 directs a signal 520 to the second access node 300' to initiate the operation of selective packet replication from the mobility agent node 108, the SPRP, to the second access node 300', as illustrated in FIG. 5. The signal 520 sent by the end node 200 is received and processed by the SPFA module 316' in the second access node 300'. The received signal 520 includes information to control the configuration and operation of the second access node 300' as an SPFP for a replicated flow of packets from an indicated SPRP, e.g., the mobility agent node 108. The received signal 520 may, and in some embodiments does, include configuration information relating to the initial operation of the SPFP, e.g., flow identification parameters, packet filtering information, and/or initial selective forwarding behavior, as well as other configuration information relating to the initial operation of the SPRP, e.g., flow identification parameters, packet filtering information, and/or initial selective replication behavior, which will be relayed in a subsequent signal to the SPRP. As part of processing the received signal 520, the SPFA module 316' in the second access node 300' directs a signal 522 to the SPRP indicated in the received signal 520, e.g., the mobility agent node 108, as illustrated in FIG. 5.

The signal 522 sent by the second access node 300' is received and processed by the mobility agent node, which in this case provides SPRA functionality. The received signal 522 includes information to control the configuration and operation of the mobility agent node 108 as an SPRP to replicate a flow of packets and direct the replicated flow of packets to an indicated SPFP, e.g., the second access node 300'. The received signal 522 may, and in some embodiments does, include configuration information relating to the initial operation of the SPRP, e.g., flow identification parameters, packet filtering information, and/or initial selective replication behavior, including information relayed from the signal 520 between the end node 200 and the second access node 300'. As part of processing the received signal 522 from the second access node 300', the mobility agent node 108 commences replicating a flow of packets matching some specific criteria and directing the replicated flow of packets to the second access node 300', e.g. via encapsulation or tunneling.

Thus, the signals 520, 522 depicted in FIG. 5 collective establish the necessary routing information to enable replicated packets destined for the end node 200 to be directed to the second access node 300', from which they can be delivered to the end node 200 via the second access link 502, e.g., along the path denoted by solid arrows 512, 514. The criteria for identification of packets to be replicated at the SPRP, which may have been either preconfigured in the mobility agent node 108 or configured in accordance with information provided in the received signal 522, can be based on a variety of known packet classification and filtering techniques, e.g., matching a set of packet header fields. Given the flexibility of this approach, the replicated packet flow could comprise, for example, all packets destined for the end node 200 or only a subset of such packets, e.g., the packets associated with a particular Voice over IP (VoIP) call. Similarly, the criteria for identification of packets to be forwarded by the SPFA modules 316, 316' at the SPFPs, which may have been either preconfigured in the SPFA data 318, 318' of the respective access nodes 300 300' or configured in accordance with information provided in the received signal 520, can be based on a variety of known packet classification and filtering techniques, e.g., matching a set of packet header fields.

FIG. 5 also depicts a sequence of packets (550, 550'), (552, 552'), (554, 554'), (556, 556'), (558, 558'), (560, 560'), 562 with sequence numbers j to j+9, being part of a packet flow destined for the end node 200. Note that the prime symbol (') is used to distinguish the replicated copy of a packet from the original copy of the same packet. The source of the packets (550, 550'), (552, 552'), (554, 554'), (556, 556'), (558, 558'), (560, 560'), 562 could be any other node in the exemplary communication system 100. In accordance with routing information maintained by other network nodes in the exemplary communication system 100, packets destined for the end node 200 are directed to the mobility agent node 108, e.g., see packet 562 with sequence number j+9. Upon reception by the mobility agent node 108, the SPRP, packets destined for end node 200 are inspected, e.g., classified or filtered, to determine if they match the criteria for selective packet replication. Packets matching the specific criteria are replicated and forwarded in parallel to both the first and second access nodes 300, 300', the SPFPs, e.g., see packets (550, 550'), (552, 552'), (554, 554'), (556, 556'), (558, 558'), (560, 560') with sequence numbers j to j+8. Packet forwarding between the SPRP and SPFPs can be accomplished via any known means, e.g., encapsulation and tunneling or native hop-by-hop routing.

The SPFA modules 316, 316' in the respective access nodes 300, 300' inspect, e.g., classify or filter, packets destined for end node 200 to determine if they match the criteria for selective packet forwarding, e.g., as specified in the corresponding SPFA data 318, 318'. Based on configuration information, e.g., in the SPFA data 318, 318', and/or the present operational state of the SPFA module 316, 316', packets destined for the end node 200 may be either forwarded from the access node 300, 300' over the corresponding access link 402, 502, buffered, or discarded. Note that, in the FIG. 5 example, the first access node 300 forwards packets 550, 552, 554 with sequence numbers j to j+2 over access link 402, while the second access node 300' discards the replicated copies 550' 552' 554' of the same packets, as represented in FIG. 5 by an X being positioned over packets 550', 552' and 554'. This illustrates a scenario where the initial behavior of the SPFA module 316' in the second access node 300' is to discard the replicated flow of packets.

FIG. 6 illustrates signaling and operations associated with switching the preferred downlink, over which packets destined for the end node 200 should be delivered. Initially in the FIG. 6 example, the state of the network and its nodes, e.g., the mobility agent node 108, the access nodes 300, 300' and the end node 200, is basically the same as in the FIG. 5 example. FIG. 6 also depicts a sequence of packets (650, 650'), (652, 652'), (654, 654'), (656, 656'), (658, 658'), (660, 660'), 662 with sequence numbers k to k+9, being part of a packet flow destined for the end node 200. As in FIG. 5, packets matching the specified criteria are replicated by the mobility agent node 108, the SPRP, and forwarded in parallel to both the first and second access nodes 300, 300', the SPFPs, e.g., see packets (650, 650'), (652, 652'), (654, 654'), (656, 656'), (658, 658'), (660, 660') with sequence numbers k to k+8. However, FIG. 6 also illustrates a change in the selective forwarding behavior of the SPFA modules 316, 316' in the respective access nodes 300, 300', as controlled by the downlink macro-diversity control module 212 in the end node 200.

The SPFA module 316 in first access node 300 forwards the packet 650 with sequence number k, while the SPFA module 316' in the second access node 300' discards the replicated copy 650' of the same packet. Following transmission of the packet 650 with sequence number k by the first access node 300, the downlink macro-diversity control module 212 in the end node 200 initiates a switch of the preferred downlink. The downlink macro-diversity control module 212 may make this determination based on a variety of factors as previously described herein. Upon making the determination to switch the preferred downlink over which the flow of packets should be delivered, the downlink macro-diversity control module 212 in the end node 200 directs signals 620, 622 to the access nodes 300, 300', the SPFPs, to indicate the desired change in selective forwarding behavior. In some embodiments, the downlink macro-diversity control module 212 in the end node 200 may send signals 620, 622 directly to either one or both of the access nodes 300, 300'. In some alternative embodiments of the present invention, the SPFA modules 316, 316' in the respective access nodes 300, 300' may exchange signals 624 over the network infrastructure to coordinate the change in selective forwarding behavior. In any case, the signals are received and processed by the SPFA modules 316, 316' in the respective access nodes 300, 300' and provide an indication regarding whether a particular flow of packets should subsequently be forwarded from the access node 300, 300' over the corresponding access link 402, 502, buffered, or discarded.

In the FIG. 6 example, upon receiving a signal, e.g., either 620 or 624, indicating the desired change in the selective forwarding behavior, the SPFA module 316 in the first access node 300, begins discarding packets 652, 654 from the particular flow. Correspondingly, upon receiving a signal, e.g., either 622 or 624, indicating the desired change in the selective forwarding behavior, the SPFA module 316' in the second access node 300', begins forwarding packets 652', 654' to the end node 200 over the corresponding access link 502. Thus, while the end node 200 receives the packet 650 with sequence number k from the first access node 300 via the first access link 402, the packets 652', 654' with sequence numbers k+1 and k+2 are received from the second access node 300' via the second access link 502. In the absence of subsequent changes in the selective forwarding behavior, replicated copies of subsequent packets in the flow, e.g., 656', 658', 660', will also be delivered from the second access node 300' via the second access link 502.

In some embodiments of the present invention, signals 620, 622, 624 indicating the change in selective forwarding behavior, include additional information to minimize duplicate delivery and/or loss of packets within the flow. In one particular embodiment of the present invention, the signals 620, 622, 624 include packet sequence identification information, e.g., a value of the identification field in an IP header or a sequence number in a Real Time Protocol (RTP) header, indicating the last packet to be delivered over the previous preferred downlink and/or the next packet to delivered over the new preferred downlink.

FIGS. 7 and 8 further illustrate the operation of downlink macro-diversity in accordance with a second exemplary embodiment. In this second exemplary embodiment of the present invention, the first access node 300 is the SPRP, where one copy of each replicated packet is directed to the end node 200 via the first access link 402 and a second copy of each replicated packet is directed to the second access node 300' for delivery to the end node 200 via the second access link 502. Each access node 300, 300' also operates as an SPFP controlling delivery of packets over its respective access links 402, 502. Thus, in the exemplary scenario depicted in FIGS. 7 and 8, the first access node 300 is both the SPRP and an SPFP, while the second access node is only an SPFP. Prior to commencing use of downlink macro-diversity, it is assumed that the current state or routing information is such that packets destined for the end node 200 are directed to the first access node 300, from which they are delivered to the end node 200 via the first access link 402, e.g., along the path denoted by solid arrows 410, 412, 414. Based, in part, on analysis of received signals from the access nodes, as previously described, the end node 200 initiates the establishment of a second access link 502 via the second access node 300'.

Upon establishment of the second access link 502, the end node 200 directs a signal 720 to the second access node 300' to initiate the operation of selective packet replication from the first access node 300, the SPRP, to the second access node 300', as illustrated in FIG. 7. The signal 720 sent by the end node 200 is received and processed by the SPFA module 316' in the second access node 300'. The received signal 720 includes information to control the configuration and operation of the second access node 300' as an SPFP for a replicated flow of packets from an indicated SPRP, e.g., the first access node 300. The received signal 720 may include configuration information relating to the initial operation of the SPFP, e.g., flow identification parameters, packet filtering information, and/or initial selective forwarding behavior, as well as other configuration information relating to the initial operation of the SPRP, e.g., flow identification parameters, packet filtering information, and/or initial selective replication behavior, which will be relayed in a subsequent signal to the SPRP. As part of processing the received signal 720, the SPFA module 316' in the second access node 300' directs a signal 722 to the SPRP indicated in the received signal 720, e.g., the first access node 300, as illustrated in FIG. 7.

The signal 722 sent by the second access node 300' is received and processed by the SPRA module 312 in the first access node 300. The received signal 722 includes information to control the configuration and operation of the first access node 300 as an SPRP to replicate a flow of packets and direct the replicated flow of packets to an indicated SPFP, e.g., the second access node 300'. The received signal 722 may, and in some embodiments does, include configuration information relating to the initial operation of the SPRP, e.g., flow identification parameters, packet filtering information, and/or initial selective replication behavior, including information relayed from the signal 720 between the end node 200 and the second access node 300'. As part of processing the received signal 722 from the second access node 300', the first access node 300 commences replicating a flow of packets matching some specific criteria and directing the replicated flow of packets to the second access node 300', e.g. via encapsulation or tunneling.

Thus, the signals 720, 722 depicted in FIG. 7 collectively establish the necessary routing information to enable replicated packets destined for the end node 200 to be directed to the second access node 300', from which they can be delivered to the end node 200 via the second access link 502, e.g., along the path denoted by solid arrows 713, 714. The criteria for identification of packets to be replicated at the SPRP, which may have been either preconfigured in the SPRA data 314 of the first access node 300 or configured in accordance with information provided in the received signal 722, can be based on a variety of known packet classification and filtering techniques, e.g., matching a set of packet header fields. Given the flexibility of this approach, the replicated packet flow could comprise, for example, all packets destined for the end node 200 or only a subset of packets, e.g., the packets associated with a particular Voice over IP (VoIP) call. Similarly, the criteria for identification of packets to be forwarded by the SPFA modules 316, 316' at the SPFPs, which may have been either preconfigured in the SPFA data 318, 318' of the respective access nodes 300, 300' or configured in accordance with information provided in the received signal 720, can be based on a variety of known packet classification and filtering techniques, e.g., matching a set of packet header fields.

FIG. 7 also depicts a sequence of packets (750, 750'), (752, 752'), (754, 754'), 756, 758, 760, 762 with sequence numbers j to j+9, being part of a packet flow destined for the end node 200. The source of the packets (750, 750'), (752, 752'), (754, 754'), 756, 758, 760, 762, could be any other node in the exemplary communication system 100. In accordance with routing information maintained by other network nodes in the exemplary communication system 100, packets destined for the end node 200 are directed to the mobility agent node 108 and then to the first access node 300, e.g., see packets 756, 758, 760, 762 with sequence number j+3 to j+9. Upon reception by the first access node 300, the SPRP, packets destined for end node 200 are inspected, e.g., classified or filtered, to determine if they match the criteria for selective packet replication. Packets matching the specific criteria are replicated and forwarded in parallel to the SPFA modules 316, 316' in both the first and second access nodes 300, 300', e.g., see packets (750, 750'), (752, 752'), (754, 754') with sequence numbers j to j+2. Packet forwarding between the first access node 300 and second access node 300' can be accomplished using various known techniques, e.g., encapsulation and tunneling or native hop-by-hop routing.

The SPFA modules 316, 316' in the respective access nodes 300, 300' inspect, e.g., classify or filter, packets destined for end node 200 to determine if they match the criteria for selective packet forwarding, e.g., as specified in the corresponding SPFA data 318, 318'. Based on configuration information, e.g., in the SPFA data 318, 318', and/or the present operational state of the SPFA module 316, 316', packets destined for the end node 200 may be either forwarded from the access node 300, 300' over the corresponding access link 402, 502, buffered, or discarded. Note that, in the FIG. 7 example, the first access node 300 is forwarding packets 750, 752, 754 with sequence numbers j to j+2 over access link 402, while the second access node 300' discards the replicated copies 750', 752', 754' of the same packets. This illustrates a scenario where the initial behavior of the SPFA module 316' in the second access node 300' is to discard the replicated flow of packets.

FIG. 8 illustrates signaling and operations associated with switching the preferred downlink, over which packets destined for the end node 200 should be delivered. Initially in the FIG. 8 example, the state of the network and its nodes, e.g., the mobility agent node 108, the access nodes 300, 300' and the end node 200, is basically the same as in the FIG. 7 example. FIG. 8 also depicts a sequence of packets (850, 850'), (852, 852'), (854, 854'), 856, 858, 860, 862 with sequence numbers k to k+9, being part of a packet flow destined for the end node 200. As in FIG. 7, packets matching the specified criteria are replicated by the first access node 300, the SPRP, and forwarded in parallel to the SPFA modules 316, 316' in the both the first and second access nodes 300, 300', e.g., see packets (850, 850'), (852, 852'), (854, 854') with sequence numbers k to k+2. However, FIG. 8 also illustrates a change in the selective forwarding behavior of the SPFA modules 316, 316' in the respective access nodes 300, 300', as controlled by the downlink macro-diversity control module 212 in the end node 200.

The SPFA module 316 in first access node 300 forwards the packet 850 with sequence number k, while the SPFA module 316' in the second access node 300' discards the replicated copy 850' of the same packet. Following transmission of the packet 850 with sequence number k by the first access node 300, the downlink macro-diversity control module 212 in the end node 200 initiates a switch of the preferred downlink. The downlink macro-diversity control module 212 may, and in some embodiments does, make this determination based on a variety of factors as previously described herein. Upon making the determination to switch the preferred downlink over which the flow of packets should be delivered, the downlink macro-diversity control module 212 in the end node 200 directs signals 820, 822 to the access nodes 300, 300', the SPFPs, to indicate the desired change in selective forwarding behavior. In some embodiments, the downlink macro-diversity control module 212 in the end node 200 may send signals 820, 822 directly to either one or both of the access nodes 300, 300'. In some alternative embodiments of the present invention, the SPFA modules 316, 316' in the respective access nodes 300, 300' may exchange signals 824 over the network infrastructure to coordinate the change in selective forwarding behavior. The signals are received and processed by the SPFA modules 316, 316' in the respective access nodes 300, 300' and provide an indication regarding whether a particular flow of packets should subsequently be forwarded from the access node 300, 300' over the corresponding access link 402, 502, buffered, or discarded.

In the FIG. 8 example, upon receiving a signal, e.g., either 820 or 824, indicating the desired change in the selective forwarding behavior, the SPFA module 316 in the first access node 300, begins discarding packets 852, 854 from the particular flow. Correspondingly, upon receiving a signal, e.g., either 822 or 824, indicating the desired change in the selective forwarding behavior, the SPFA module 316' in the second access node 300', begins forwarding packets 852', 854' to the end node 200 over the corresponding access link 502. Thus, while the end node 200 receives the packet 850 with sequence number k from the first access node 300 via the first access link 402, the packets 852', 854' with sequence numbers k+1 and k+2 are received from the second access node 300' via the second access link 502. In the absence of subsequent changes in the selective forwarding behavior, replicated copies of subsequent packets in the flow will also be delivered from the second access node 300' via the second access link 502.

In some embodiments of the present invention, signals 820, 822, 824 indicating the change in selective forwarding behavior include additional information to minimize duplicate delivery and/or loss of packets within the flow. In one particular embodiment of the present invention, the signals 820, 822, 824 include packet sequence identification information, e.g., a value of the identification field in the IP header or a sequence number in a Real Time Protocol (RTP) header, indicating the last packet to be delivered over the previous preferred downlink and/or the next packet to delivered over the new preferred downlink. The information is communicated from an end node to one or more access nodes to control the selection of which of a plurality of downlinks is used to communicate portions of packets to the end node at any given time In some embodiments of the present invention, communications between nodes is based all, or in part, on IP internetworking. Thus, communication of both data and/or control signaling between the network nodes may use IP packets, e.g., datagrams. In embodiments of the present invention that utilize IP packets, said IP packets may be delivered to the intended destination nodes using either unicast or multicast addressing and delivery mechanisms. The use of IP multicast is particularly useful when the same information is sent from one node to a plurality of other nodes. In cases where the same information, e.g., packet payload data, is sent to a plurality of targeted nodes using unicast delivery, a separate IP packet with a copy of the information is sent by the source node to each targeted node. Alternatively, when the same information is sent to a plurality of targeted nodes using multicast delivery, a single IP packet with the information is sent by the source node and network nodes replicate the packet as required for delivery to each targeted node. Thus, IP multicast provides a more efficient method of delivering information from a source node to a group of destination nodes. In some embodiments of the present invention, IP multicast is used for delivery of replicated packet flows between the SPRP and one or more SPFPs. In such embodiments, the SPRP may not actually replicate the packets matching the specified criteria, but instead encapsulate packets matching the particular flow with an additional IP header destined to a particular IP multicast group and forward the encapsulated packets based on IP multicast routing information. Correspondingly, in such embodiments, the SPFPs join the particular IP multicast group to receive copies of the encapsulated packets.

FIG. 9 is a sectorized example 900 which illustrates signaling and operations associated with switching the preferred downlink, over which portions of packets destined for the end node 200 should be delivered. The portions of packets may be e.g., complete packets or, in cases where one or more packets are transmitted using multiple frames for a packet, frames. Switching between utilized connections need not be limited to packet boundaries but may occur at frame boundaries which occur within a packet. Thus, in the FIG. 9 example, different portions, e.g., frames, corresponding to the same packet may be transmitted to the end node over different communication connections, e.g., wireless links, each corresponding to a different sector, protocol or standard, without the need to transmit the same packet portion to the end node multiple times. The FIG. 9 example is similar to the FIG. 8 example but with different sectors of the same access node 300 providing the different connections to the end node 200 rather than two different access nodes. The solid arrows 915, 917, 925, 927, 935, 937 depict two possible paths that may be followed to deliver portions of packets to the end node 200. FIG. 9 depicts a sequence of packets 950, (952, 952'), 954, (956, 956'), 958, 960, 962, 964,966 with sequence numbers k to k+9, being part of a packet flow destined for the end node 200. Each packet may be transmitted in one or more portions using frames. In the FIG. 9 example, first and second portions of packet k+1 are transmitted using first and second frames k+1_1 952 and k+1_2 952', respectively and first and second portions of packet k+3 are transmitted using first and second frames k+3_1 956 and k+3_2 956', respectively.

Upon receiving portions of packets from different communications connections, the end node 200 will reassemble the packet portions, when they include partial packets, into complete packets and then reorder the packets as may be needed to reconstruct the packet stream transmitted to the end node 200.

In the FIG. 9 example, the end node 200 maintains connections 902, 905 to different sectors corresponding to different wirelesses interfaces 330, 340 of cell 300. Control signals 920, 922, e.g., indicating which communications connection 902, 905 is to be used for transmitting portions of packets at any point in time, are communicated from the end node to one or more of the wireless interfaces 330, 340 via the corresponding communication connections 902, 905. This information 920, 922 is communicated to the packet routing/forwarding control module 311 as signals 920' and 922', respectively. Packet routing/forwarding control module 311 is responsible for controlling the routing of portions of packets to individual sectors for transmission over the preferred communication connection 902, 905. The module 311 receives the flow of packets to be delivered to the end node 200, as indicated by the arrows 935, 937 and directs, e.g., forwards them, to the desired interface 330 or 340 depending on the signals form the end node 200. Packet direction can be performed within the access node at a level of granularity that is finer than the packet level, e.g., at frame boundaries. Alternatively, packet redirection, e.g., switching between which sector is used to transmit packets, may be limited to occurring at packet boundaries. In many implementations, packet boundaries will correspond to a frame boundary but in cases where packets may be transmitted using multiple frames, one or more additional frame boundaries may occur within a packet.

In FIG. 9, in response to signal 920 from the end node 200, portions of packets, e.g., the first and second portion of packet k+3 (956, 956'), are first directed to end node 200 via the first wireless interface 330 (along the path indicated by arrows 925 and 915), which correspond to a first sector. Then, in response to signal 922, the packet routing/forwarding control module redirects the flow of packets so that portions of packets, e.g., packet k+4 958 are now directed to the end node 200 via the second wireless interface 340 (along the path indicated by arrows 927 and 917), which corresponds to a second sector. Note that in this example, switching between sectors used to deliver packets occurs at frame boundaries which are not limited in this example to packet boundaries. As shown, the first portion (e.g., frame) 952 of packet k+1 is delivered via the second wireless interface 340 corresponding to the second sector, while the second portion 952' of packet k+1 is delivered via the first wireless interface 330 corresponding to the first sector.

In the FIG. 9 exemplary embodiment, duplication of portions of packets is not required since direction of packet portions occurs using a module 311 which interacts and controls operation of the different sectors in access node 300. In some embodiments multi-sector access nodes are implemented as a cluster of single cell access nodes co-located in a single housing. In such implementations, frame switching/redirection can be supported but the process may involve duplication of frames and/or packets in a manner that is generally the same as in FIG. 8 where each access node 300, 300' would correspond to a sector of a multi-sector access node.

In the FIG. 9 example, each portion of a packet in the packet stream directed to the end node 200 is sent over a single one of the communication connections 902, 905. Switching between the downlink paths 915, 917 corresponding to the connections 902, 905 may occur multiple times while an uplink path between said end node 200 and one of the wireless interfaces 330, 340 remains constant and is used to communicate packets from the end node 200. The communications connections 902, 905 may be physical and/or link layer connections. In some embodiments the end node 200 transmits instructions to one or more access nodes regarding which downlink to use at a particular point in time, e.g., with the end node selecting the downlink based on physical or link layer conditions detected by the end node. However, in some embodiments the end node 200 transmits connection condition information, e.g., detected physical or link layer connection information, e.g., channel information, which is used by the receiving node or nodes to determine which of a plurality of communications connections should be used as the downlink for transmitting portions of packets at any given point in time. Such embodiments are particularly well suited where the multiple communication connections, e.g., downlinks, are between a single access node, e.g., different sectors of the same access node, and the end node. In such a case a single decision making module within the sectorized access node is able to assess condition information concerning each communication connection and make the connection determination, e.g., selection, based on the received information relating to the multiple connections.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be used with CDMA, orthogonal frequency division multiplexing (OFDM), or various other types of communications techniques which may be used to provide wireless communications links between access nodes and mobile nodes. Accordingly, in some embodiments the access nodes are implemented as base stations which establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method by a first access node, comprising:
   duplicating a subset of incoming packets that are destined for an end node and that match criteria specified in configuration data as a plurality of duplicate packets based on a signal received from a second access node;
   forwarding at least one packet of the subset of the incoming packets to the end node;
   receiving an indication of a desired change of a preferred downlink from a first access link corresponding to the first access node to a second access link corresponding to the second access node; and
   discarding by the first access node one or more packets of the subset of the incoming packets without sending the one or more packets of the subset of the incoming packets to the end node in response to the indication.

2. The method as in claim 1, wherein forwarding the at least one packet to the end node comprises forwarding the at least one packet to at least one infrastructure entity that forwards the at least one packet to the end node.

3. The method as in claim 2 further comprising partitioning a series of packets as a plurality of packet portions and duplicating said packet portions as a plurality of duplicate packet portions.

4. The method as in claim 1 further comprising partitioning a series of packets as a plurality of packet portions and duplicating said packet portions as a plurality of duplicate packet portions.

5. The method as in claim 1 wherein said duplicate packets are duplicate packet portions of a series of packets.

6. The method of claim 1, wherein the first access node changes from forwarding to discarding packets in response to receiving the indication.

7. The method of claim 6, wherein in the absence of subsequent changes in the preferred downlink the first access node discards multiple packets.

8. The method of claim 1, wherein the criteria specified in the configuration data identify a Voice over IP (VoIP) call, and wherein the subset of the incoming packets that are duplicated correspond to the VoIP call.

9. A first access node, comprising:
means for duplicating a subset of incoming packets that are destined for an end node and that match criteria specified in configuration data as a plurality of duplicate packets based on a signal received from a second access node;
means for forwarding at least one packet of the subset of the incoming packets to the end node;
means for receiving an indication of a desired change of a preferred downlink from a first access link corresponding to the first access node to a second access link corresponding to the second access node; and
means for discarding by the first access node one or more subsets of the subset of the incoming packets without sending the one or more packets of the subset of the incoming packets to the end node in response to the indication.

10. The first access node as in claim 9, wherein the means for forwarding the at least one packet to the end node comprises means for forwarding the at least one packet to at least one infrastructure entity that forwards the at least one packet to the end node.

11. The first access node as in claim 10 further comprising means for partitioning a series of packets as a plurality of packet portions and means for duplicating said packet portions as a plurality of duplicate packet portions.

12. The first access node as in claim 9 further comprising means for partitioning a series of packets as a plurality of packet portions and means for duplicating said packet portions as a plurality of duplicate packet portions.

13. The first access node as in claim 9 wherein said duplicate packets are duplicate packet portions of a series of packets.

14. A first access node, comprising:
a processor; and
circuitry coupled to said processor configured to duplicate a subset of incoming packets that are destined for an end node and that match criteria specified in configuration data as a plurality of duplicate packets based on a signal received from a second access node, forward at least one packet of the subset of the incoming packets to the end node, receive an indication of a desired change of a preferred downlink from a first access link corresponding to the first access node to a second access link corresponding to the second access node, and discard one or more packets of the subset of the incoming packets without sending the one or more packets of the subset of the incoming packets to the end node in response to the indication.

15. The first access node as in claim 14, wherein the circuitry configured to forward the at least one packet to the end node comprises circuitry configured to forward the at least one packet to at least one infrastructure entity that forwards the at least one packet to the end node.

16. The first access node as in claim 15, wherein the circuitry is further configured to partition a series of packets as a plurality of packet portions and duplicate the packet portions as a plurality of duplicate packet portions.

17. The first access node as in claim 14, wherein the circuitry is further configured to partition a series of packets as a plurality of packet portions and duplicate the packet portions as a plurality of duplicate packet portions.

18. The first access node as in claim 14, wherein the duplicate packets are duplicate packet portions of a series of packets.

19. A computer-program product comprising a non-transitory computer-readable medium having instructions thereon capable of being executed by a computer, the instructions comprising:
code for causing a first access node to duplicate a subset of incoming packets that are destined for an end node and that match criteria specified in configuration data as a plurality of duplicate packets based on a signal received from a second access node;
code for causing the first access node to forward at least one packet of the subset of the incoming packets to the end node;
code for causing the first access node to receive an indication of a desired change of a preferred downlink from a first access link corresponding to the first access node to a second access link corresponding to the second access node; and
code for causing the first access node to discard one or more packets of the subset of the incoming packets without sending the one or more packets of the subset of the incoming packets to the end node in response to the indication.

* * * * *